US009555784B2

(12) United States Patent
Van Dyke et al.

(10) Patent No.: US 9,555,784 B2
(45) Date of Patent: Jan. 31, 2017

(54) BRAKING SYSTEM AND METHOD FOR MACHINE

(71) Applicant: Caterpillar Inc., Peoria, IL (US)

(72) Inventors: Bryan D. Van Dyke, Zion, IL (US);
Ethan M. Tevis, Bloomington, IL (US);
Dwanz M. Mwasi, Decatur, IL (US);
Michael R. Kunde, Decatur, IL (US);
Aaron P. Hofner, Maroa, IL (US);
Steven E. Johnson, Crest Hill, IL (US);
Chad L. Kassube, Peoria, IL (US);
Matthew D. Meads, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 14/568,431

(22) Filed: Dec. 12, 2014

(65) Prior Publication Data
US 2016/0167634 A1   Jun. 16, 2016

(51) Int. Cl.
| | |
|---|---|
| *B60T 11/34* | (2006.01) |
| *B60T 8/34* | (2006.01) |
| *B60T 8/171* | (2006.01) |
| *B60T 11/10* | (2006.01) |
| *B60T 13/66* | (2006.01) |
| *B60T 13/68* | (2006.01) |

(Continued)

(52) U.S. Cl.
CPC ............ *B60T 8/341* (2013.01); *B60T 8/171* (2013.01); *B60T 8/36* (2013.01); *B60T 8/3605* (2013.01); *B60T 11/101* (2013.01); *B60T 13/662* (2013.01); *B60T 13/686* (2013.01); *B60T 8/3655* (2013.01); *B60T 11/24* (2013.01); *B60T 15/045* (2013.01)

(58) Field of Classification Search
CPC ......... B60T 11/21; B60T 11/101; B60T 11/24; B60T 13/66; B60T 13/68; B60T 13/683; B60T 13/70; B60T 13/141; B60T 15/043; B60T 15/045; B60T 15/046
USPC .................... 303/DIG. 1, DIG. 2, DIG. 3
See application file for complete search history.

(56) References Cited

U.S. PATENT DOCUMENTS 4,685,745 A * 8/1987 Reinecke .............. B60T 8/1708
  303/112
4,729,607 A   3/1988 Johnson
(Continued)

FOREIGN PATENT DOCUMENTS

DE         4408229        9/1995

*Primary Examiner* — Nicholas J Lane
(74) *Attorney, Agent, or Firm* — Jeff A. Greene (57) ABSTRACT

A braking system for a machine includes a first valve assembly having a first electronically actuated proportional valve, and a second valve assembly having a second electronically actuated proportional valve. The braking system includes a first pressure sensor and a second pressure sensor disposed downstream of the first and second valve assemblies, respectively. The first and second pressure sensors are configured to determine a first pressure and a second pressure of a braking fluid from the first and second valve assembly. The braking system also includes a controller configured to receive a signal indicative of the first pressure and the second pressure of the braking fluid and compare the first pressure and the second pressure. The controller is configured to selectively actuate at least one of the first electronically actuated proportional valve and the second electronically actuated proportional valve to substantially equalize the first pressure and the second pressure.

7 Claims, 5 Drawing Sheets

(51) Int. Cl.
  *B60T 8/36* (2006.01)
  *B60T 11/24* (2006.01)
  *B60T 15/04* (2006.01)

(56) References Cited

U.S. PATENT DOCUMENTS

| | | | | |
|---|---|---|---|---|
| 4,861,115 | A * | 8/1989 | Petersen | B60T 8/268 |
| | | | | 303/118.1 |
| 4,887,636 | A * | 12/1989 | Rothen | B60T 8/327 |
| | | | | 137/487.5 |
| 6,082,835 | A * | 7/2000 | Brearley | B60T 8/00 |
| | | | | 303/112 |
| 6,309,029 | B1 * | 10/2001 | Wakabayashi | B60T 8/261 |
| | | | | 188/106 P |
| 6,592,190 | B2 | 7/2003 | Dunbar et al. | |
| 2009/0280959 | A1 * | 11/2009 | Bensch | B60T 8/1708 |
| | | | | 477/198 |
| 2012/0111678 | A1 * | 5/2012 | Alberti | B60T 11/101 |
| | | | | 188/345 |

* cited by examiner

BRAKING SYSTEM AND METHOD FOR MACHINE

TECHNICAL FIELD

The present disclosure relates to a braking system and method for a machine.

BACKGROUND

Typically, machines, such as motor graders, may include a braking system having two independent braking circuits for increased safety and to conform to statutory regulations. Such a braking system generally includes two separate brake valves or two sections within the same brake valve. Due to design and tolerances, these separate brake valves or valve sections typically result in a pressure bias, i.e., different braking pressures for the two braking circuits. This pressure bias may cause premature brake failure due to higher pressure and resulting higher energy load.

Various solutions are proposed in the prior art to decrease the pressure bias. For example, a mechanical device, such as a by-pass valve, may be provided to reduce the pressure bias. However, using such mechanical devices may increase cost of the braking system. Additionally, the mechanical devices may not be suitable for dynamic changes in pressure bias.

For reference, U.S. Pat. No 4,729,607 discloses a dual circuit brake valve with a delivery differential control mechanism which controls the differential between the delivery pressures of the primary and secondary braking circuits. The delivery differential control mechanism includes a spring retainer which is mounted on the end of the stem of the relay valve and which receives a spring-biased plunger. The plunger engages with the actuating member during the brake application to thereby transfer the force of the spring to the relay member and therefore to the valve members of the secondary circuit. This transfer of the spring force reduces the crack open pressure of the valve members controlling communication through the secondary circuit, to thereby reduce the differential between the pressures generated and the primary and secondary circuits.

SUMMARY OF THE DISCLOSURE

In one aspect of the present disclosure, a braking system for a machine is provided. The braking system includes a first valve assembly having a first electronically actuated proportional valve and a first directional valve fluidly coupled to the first electronically actuated proportional valve. The braking system also includes a second valve assembly having a second electronically actuated proportional valve and a second directional valve fluidly coupled to the second electronically actuated proportional valve. The braking system further includes a first pressure sensor and a second pressure sensor disposed downstream of the first valve assembly and the second valve assembly, respectively. The first pressure sensor is configured to determine a first pressure of a braking fluid from the first valve assembly. The second pressure sensor is configured to determine a second pressure of the braking fluid from the second valve assembly. The braking system also includes a controller communicably coupled to the first pressure sensor, the second pressure sensor, the first valve assembly and the second valve assembly. The controller is configured to receive a signal indicative of the first pressure and the second pressure of the braking fluid downstream of the first valve assembly and the second valve assembly, respectively. The controller is also configured to compare the first pressure and the second pressure. The controller is further configured to selectively actuate at least one of the first electronically actuated proportional valve and the second electronically actuated proportional valve to substantially equalize the first pressure and the second pressure based on the comparison between the first pressure and the second pressure in a closed loop.

In another aspect of the present disclosure, a method of operating a braking system is provided. The method includes receiving a signal indicative of a first pressure of a braking fluid downstream of a first valve assembly. The first valve assembly includes a first directional valve and a first electronically actuated proportional valve. The method also includes receiving a signal indicative of a second pressure of the braking fluid downstream of a second valve assembly. The second valve assembly includes a second directional valve and a second electronically actuated proportional valve. The method further includes comparing the first pressure and the second pressure, and selectively actuating at least one of the first electronically actuated proportional valve and the second electronically actuated proportional valve to substantially equalize the first pressure and the second pressure based on the comparison between the first pressure and the closed pressure in a closed loop.

In yet another aspect of the present disclosure, a braking system for a machine is provided. The braking system includes a first valve assembly having a first solenoid valve and a first directional valve fluidly coupled to the first solenoid valve. The braking system also includes a second valve assembly having a second solenoid valve and a second directional valve fluidly coupled to the second solenoid valve. The braking system further includes a first pressure sensor and a second pressure sensor disposed downstream of the first valve assembly and the second valve assembly, respectively. The first pressure sensor is configured to determine a first pressure of a braking fluid from the first valve assembly. The second pressure sensor is configured to determine a second pressure of the braking fluid from the second valve assembly. The braking system also includes an electronically actuated directional valve in fluid communication with the first valve assembly and the second valve assembly. The braking system also includes a controller communicably coupled to the electronically actuated directional valve, the first pressure sensor, the second pressure sensor, the first valve assembly and the second valve assembly. The controller is configured to receive a signal indicative of the first pressure and the second pressure of the braking fluid downstream of the first valve assembly and the second valve assembly, respectively. The controller is also configured to compare the first pressure and the second pressure. The controller is further configured to selectively actuate the electronically actuated directional valve and at least one of the first electronically actuated directional valve and the second electronically actuated directional valve to substantially equalize the first pressure and the second pressure based on the comparison between the first pressure and the second pressure in a closed loop.

DETAILED DESCRIPTION

Figure 1:
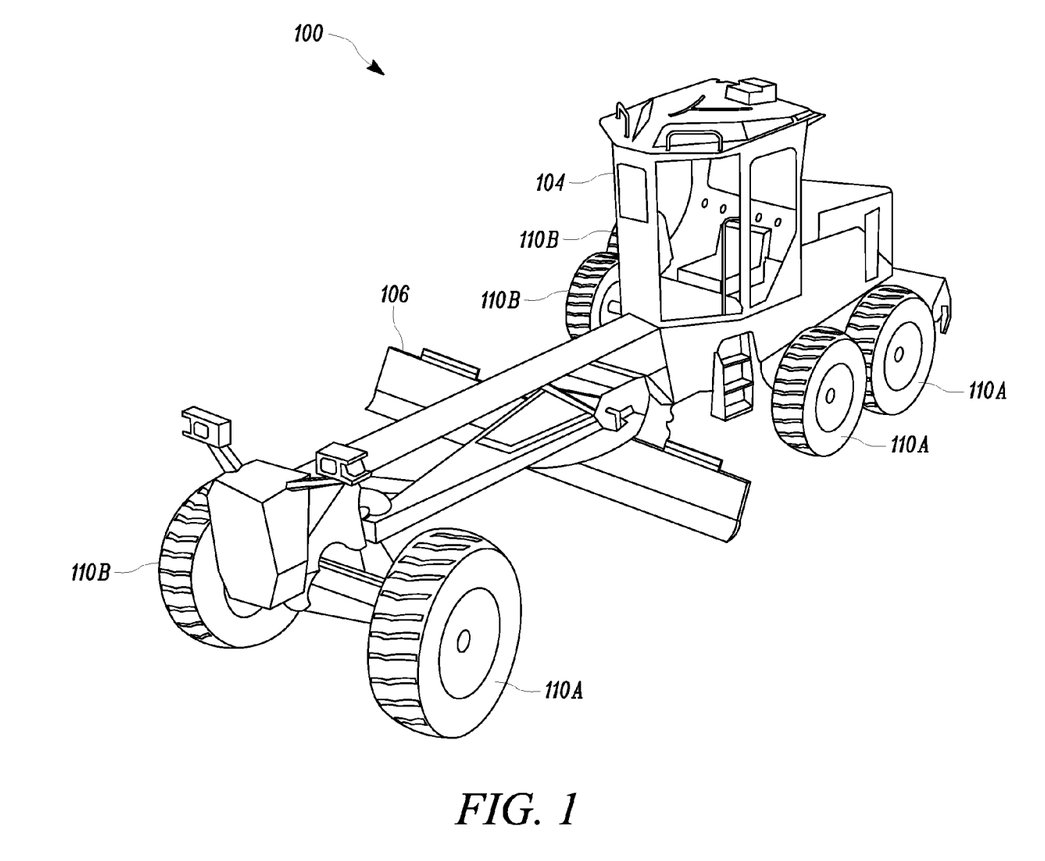
FIG. 1 is a perspective view of an exemplary machine.

Wherever possible, the same reference numbers will be used throughout the drawings to refer to the same or the like parts. Referring to FIG. 1, an exemplary machine 100 is illustrated. The machine 100 may be a mobile vehicle that performs one or more operations associated with an industry such as mining, construction, farming, transportation, or any other industry known in the art. In the illustrated embodiment, the machine 100 may be a motor grader. However, the machine 100 may be a wheel loader, a backhoe, an excavator, a scraper, a dozer, a compactor, an off-highway truck, a passenger vehicle, or any other machine known in the art.

In the illustrated embodiment, the machine 100 includes a power source such as an engine (not shown), an operator station or cab 104 containing input devices and operator interfaces for operating the machine 100, and a work tool or an implement 106, such as a blade. The input devices may include one or more devices disposed within the cab 104 and may be configured to receive inputs from the operator. The inputs may be indicative of controlling propulsion of the machine 100 and/or operation of the implement 106.

The machine 100 may include a first set of ground engaging members 110A on one side of the machine 100 and a second set of ground engaging members 110B on other side of the machine 100. For example, the first and second set of ground engaging members 110A, 110B may be on a left side and a right side of the machine. The first set of ground engaging members 110A and the second set of ground engaging members 110B may be adapted for steering and maneuvering the machine 100, and for propelling the machine 100 in forward and reverse directions. In the illustrated embodiment, the first and second set of ground engaging members 110A, 110B are wheels. However, in an alternative embodiment, the first and second set of ground engaging members 110A, 110B may include track assemblies.

Further, the first set of ground engaging members 110A may be associated with one or more first brakes 122A and the second set of ground engaging members 110B may be associated with one or more second brakes 122B. The first brakes 122A and the second brakes 122B may include braking members (not shown) such as, brake discs, brake pads and the like. Each of the first brakes 122A and the second brakes 122B may be configured to provide a braking force on the corresponding first set of ground engaging members 110A and the second set of ground engaging members 110B. The braking force may slow the machine 100 or prevent the machine 100 from moving. The first and second brakes 122A, 122B may be actuated by a braking system 200 which will be described hereinafter.

Figure 2:
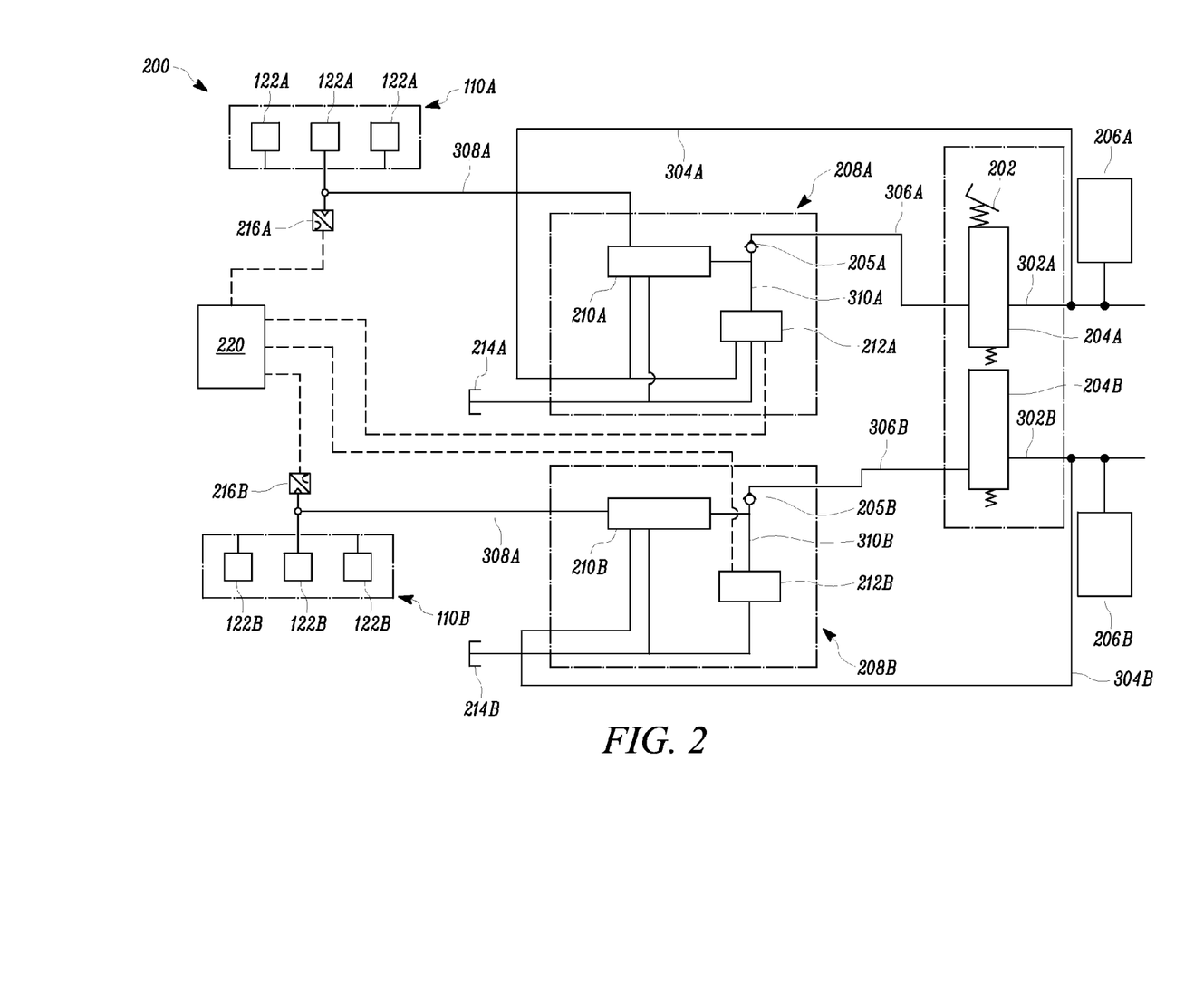
FIG. 2 is a block diagram of a braking system associated with the machine, according to an embodiment of the present disclosure.
Figure 3:
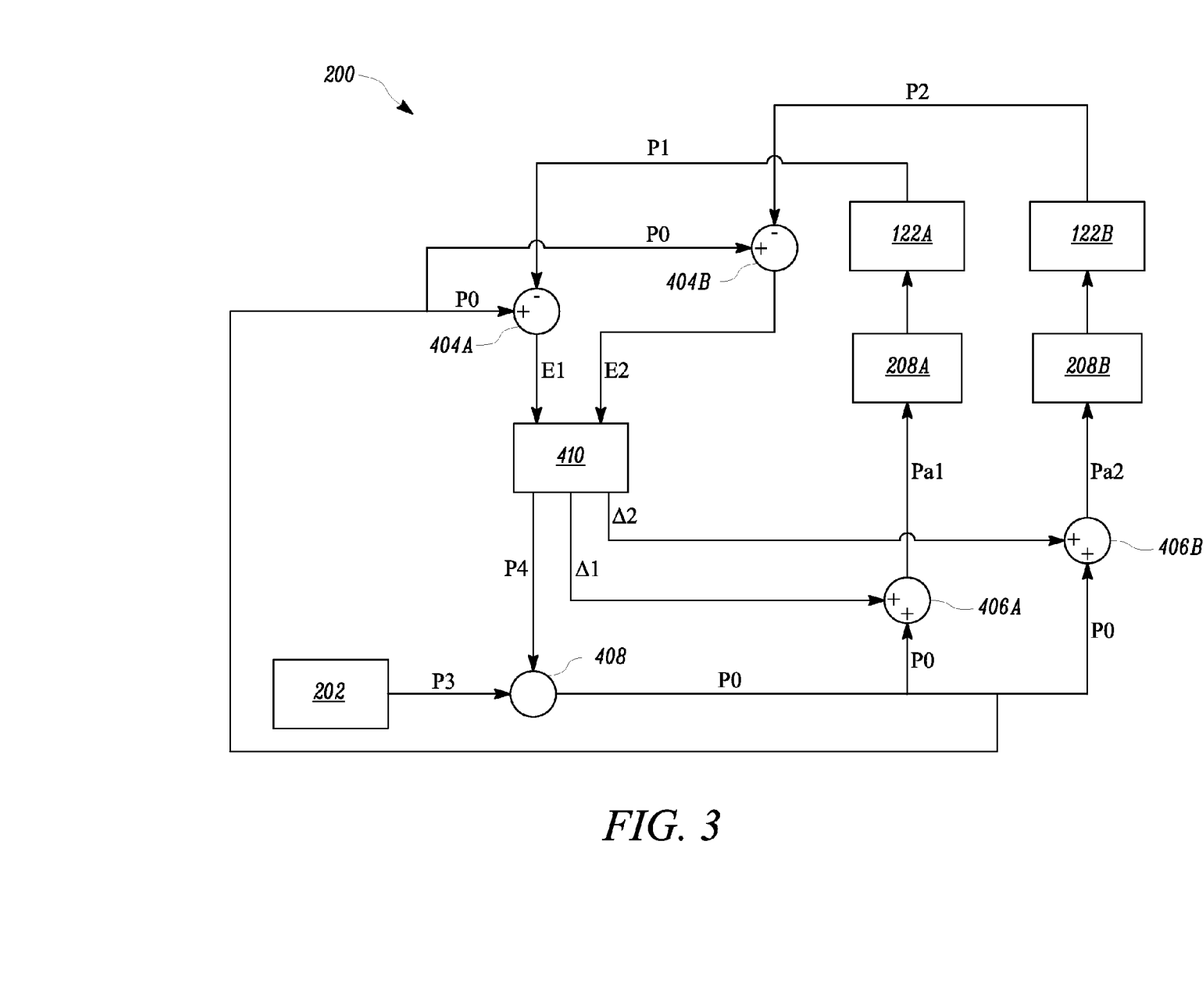
FIG. 3 is a control diagram for the braking system of FIG. 2, according to an embodiment of the present disclosure.

Referring to FIG. 2, a block diagram of the braking system 200 for the machine 100 is illustrated, according to an embodiment of the present disclosure. Referring to FIG. 3, a control diagram for operation of the braking system 200 is illustrated, according to an embodiment of the present disclosure. The braking system 200 will now be explained in detail with reference to FIGS. 2 and 3.

The braking system 200 may include a brake pedal 202 disposed within the cab 104. A braking command to activate the first and second brakes 122A, 122B associated with the first and second set of ground engaging members 110A, 110B may be provided via the brake pedal 202. Specifically, an operator may provide an input indicative of the braking command by applying a force on the brake pedal 202. Further, the braking force applied on the first and second set of ground engaging members 110A, 110B may vary based on the force applied on the brake pedal 202. Though the brake pedal 202 is shown in the illustrated embodiment, any other input device may be used for actuating the brakes. Examples of such input devices include a lever, a button, a joystick, and the like.

In the illustrated embodiment, the braking system 200 may include a first brake valve 204A and a second brake valve 204B configured to receive the input indicative of the braking command from the brake pedal 202. Alternatively, the braking system 200 may include a single brake valve with two separate brake sections.

The first brake valve 204A may be a directional valve configured to direct a flow of the braking fluid therethrough. In the illustrated embodiment, the first brake valve 204A may include two ports and may operate in two positions. The two positions may be a working position and a closed position. The first brake valve 204A may be in a normally closed position. The first brake valve 204A may be actuated to the working position upon receiving the braking command via the brake pedal 202. In the working position, the first brake valve 204A may be configured to receive the braking fluid via a hydraulic line 302A.

The second brake valve 204B may operate substantially similar to the first brake valve 204A. Accordingly, the second brake valve 204B may be configured to receive the braking fluid via a hydraulic line 302B in the working position.

The braking system 200 may include a first accumulator 206A and a second accumulator 206B configured to deliver the braking fluid to the first brake valve 204A and the second brake valve 204B through the hydraulic lines 302A, 302B, respectively. Further, the first brake valve 204A and the second brake valve 204B may route the braking fluid to a control line 306A and a control line 306B respectively.

The braking system 200 may also include a first valve assembly 208A and a second valve assembly 208B disposed in fluid communication with the first brake valve 204A and the second brake valve 204B, respectively. The first valve assembly 208A and the second valve assembly 208B may also be in fluid communication with the first accumulator 206A.

The first valve assembly 208A includes a first directional valve 210A configured to selectively supply the pressurized braking fluid to actuate the first brakes 122A associated with the first set of ground engaging members 110A via a supply line 308A. The first directional valve 210A may a hydromechanical valve. The first directional valve 210A may include three ports and three positions. The three positions may be a working position, a closed position, and a discharge position. The first directional valve 210A may be in a normally closed position at which the passage of the braking fluid may be restricted therethrough.

The first directional valve 210A may be actuated to the working position by the pressurized braking fluid in the control line 306A. As shown in FIG. 2, the first valve assembly 208A may include a first check valve 205A disposed between the first brake valve 204A and the first directional valve 210A. The first check valve 205A may be configured to allow a unidirectional flow the braking fluid therethrough from the first brake valve 204A to the first directional valve 210A. Further, the first check valve 205A may receive the braking fluid from the first brake valve 204A via the control line 306. The first directional valve 210A may be actuated to the working position by the pressurized braking fluid received via the control line 306A.

In the working position, the first directional valve 210A may be opened and configured to receive the braking fluid from the first accumulator 206A via a hydraulic line 304A. Further, the first directional valve 210A may route the braking fluid to each of the brakes associated with the first set of ground engaging members 110A via a supply line 308A. The first directional valve 210A may be actuated to the discharge position by releasing the force on the brake pedal 202. In the discharge position, the first directional valve 210A may route the braking fluid to a first reservoir 214A thereby deactivating the brakes associated with the first set of ground engaging members 110A.

The first valve assembly 208A also includes a first electronically actuated proportional valve 212A (hereinafter referred to as the first proportional valve 212A) in fluid communication with the first directional valve 210A. The first proportional valve 212A may also be in fluid communication with the first accumulator 206A. The first proportional valve 212A may be configured to route the braking fluid to the first directional valve 210A via a control line 310A.

In the illustrated embodiment, the first proportional valve 212A may be solenoid operated valve. The first proportional valve 212A may include three ports and operate in three positions namely a working configuration, a closed configuration and a discharge configuration. The first proportional valve 212A may be in a normally closed configuration and may be actuated to the working configuration. The first proportional valve 212A may be partially opened or fully opened in the working configuration. For example, an extent of opening of the first proportional valve 212A may depend on actuation by an associated solenoid upon receiving an electronic signal.

In the working configuration, the first proportional valve 212A may receive the braking fluid from the first accumulator 206A via the hydraulic line 304A. Further, the first proportional valve 212A may route the braking fluid to the first directional valve 210A via the control line 310A. A pressure of the braking fluid downstream of the first directional valve 210A may increase upon additionally receiving the braking fluid through the control line 310A. Moreover, an amount of the braking fluid routed to the first directional valve 210A may be controlled by controlling an extent of opening of the first proportional valve 212A. In the discharge position, the first proportional valve 212A may route the braking fluid to the first reservoir 214A. The first proportional valve 212A may therefore be able to regulate a control pressure applied on the first directional valve 210A, and hence regulates a pressure of the braking fluid in the supply line 308A downstream of the first directional valve 210A.

The second valve assembly 208B may be hydraulically isolated from the first valve assembly 208A. The second valve assembly 208B may be substantially similar to the first valve assembly 208A in arrangement and function. Accordingly, the second valve assembly 208B includes a second directional valve 210B configured to supply the pressurized braking fluid to actuate the brakes associated with the second set of ground engaging members 110B via a supply line 308B. Further, the second directional valve 210B may be actuated to a working position by the pressurized braking fluid received from the second brake valve 204B via the control line 306B.

As illustrated in FIG. 2, the second valve assembly 208B may be associated with a second check valve 205B and a second reservoir 214B. In an embodiment, the braking system 200 may include a single reservoir instead of the first and second reservoirs 214A, 214B.

The second valve assembly 208B also includes a second electronically actuated proportional valve 212B (hereinafter referred to as the second proportional valve 212B) in fluid communication with the second directional valve 210B. The second proportional valve 212B may be configured to receive the braking fluid from the second accumulator 206B via a hydraulic line 304B in a working position. The second proportional valve 212B may route the braking fluid to the second directional valve 210B via a control line 310B.

Each of the first brakes 122A and the second brakes 122B may be associated with a hydraulic cylinder that is configured to be actuated by the by the braking fluid received via the supply lines 308A and 308B respectively. The cylinders may actuate the corresponding braking members of the first and second brakes 122A, 122B associated with the first set of ground engaging members 110A and the second set of ground engaging members 110B. Upon actuation, the first brakes 122A and the second brakes 122B may apply the braking force on the corresponding first set of ground engaging members 110A and the second set of ground engaging members 110B. Moreover, the braking forces applied by the first and second brakes 122A, 122B may depend on a pressure of the braking fluid received via the corresponding supply lines 308A and 308B.

The braking system 200 includes a first pressure sensor 216A disposed downstream of the first valve assembly 208A. The first pressure sensor 216A is configured to determine a first pressure of the braking fluid from the first valve assembly 208A. In an embodiment, the first pressure sensor 216A may be disposed in the supply line 308A. As such, the first pressure may be indicative of a pressure of the braking fluid from the first valve assembly 208A. In another embodiment, the first pressure sensor 216A may be disposed at the first brakes 122A. As such, the first pressure may be indicative of a braking pressure applied by the first brakes 122A on the first set of ground engaging members 110A. Similarly, the second pressure sensor 216B may be positioned and configured relative to the second valve assembly 208B to determine the second pressure. In an embodiment, the first pressure may not be equal to the second pressure. In this case, a difference between the first pressure and the second pressure may exceed a threshold error.

The braking system 200 further includes a controller 220 that is communicably coupled to the first pressure sensor 216A and the second pressure sensor 216B. The controller 220 may embody a single microprocessor or multiple microprocessors configured for receiving signals from the components of the braking system 200. Numerous commercially available microprocessors may be configured to perform the functions of the controller 220. The controller 220 may also embody a machine microprocessor capable of controlling numerous machine functions. A person of ordinary skill in the art will appreciate that the controller 220 may additionally include other components and may also perform other functions not described herein.

Referring to FIG. 3, the controller 220 is configured to receive signals P1, P2 indicative of the first pressure and the second pressure from the first pressure sensor 216A and the second pressure sensor 216B. The controller 220 may also be configured to receive the input indicative of the braking command from the brake pedal 202. Further, the controller

220 may determine a desired braking pressure based on the braking command from the brake pedal 202.

In the illustrated embodiment, the controller 220 may be further configured to compare the first pressure and the second pressure to a reference pressure P0. Accordingly, the controller 220 may include a first error module 404A and a second error module 404B configured to determine a first pressure error E1 and a second pressure error E2. The first error module 404A may be configured to receive the signal P1 indicative of the first pressure. Similarly, the second error module 404B may be in communication with the second pressure sensor 216B and configured to receive the signal P2 indicative of the second pressure.

During a first cycle of the control loop adapted by the controller 220, the reference pressure P0 may be the desired braking pressure corresponding to the braking command from the brake pedal 202. The first error module 404A and the second error module 404B may further receive the signal P3 indicative of the desired braking pressure from the controller 220. Further, the first error module 404A is configured to determine the first pressure error E1 based on a difference between the first pressure and the reference pressure P0. Similar to the first error module 404A, the second error module 404B is also configured to determine the second pressure error E2 based on a difference between the second pressure and the reference pressure P0.

The controller 220 further includes a control software module 410 configured to determine a first pressure adjustment $\Delta 1$ and the second pressure adjustment $\Delta 2$. The first pressure adjustment $\Delta 1$ and the second pressure adjustment $\Delta 2$ are determined based on the first pressure error E1 and the second pressure error E2. The control software module 410 may utilize various pre-stored relations such as, relationship between the amount of the braking fluid and the pressure of the braking fluid. In an embodiment, the control software module 410 may also determine an adjusted braking pressure P4 based on the first pressure error E1 and the second pressure error E2.

Further, the controller 220 may include a first adder 406A and a second adder 406B configured to determine a first adjusted pressure Pa1 and a second adjusted pressure Pa2. The first adder 406A may determine the first adjusted pressure Pa1 based on the first pressure adjustment $\Delta 1$ and the reference pressure P0. Similarly, the second adder 406B may determine the second adjusted pressure Pa2 based on the second pressure adjustment $\Delta 2$ and the reference pressure P0.

In an embodiment, the controller 220 may consider the reference pressure P0 as the maximum between the desired braking pressure and the adjusted braking pressure P4. Accordingly, the controller 220 may include a comparator 408 configured to receive the signal P3 indicative of the desired braking pressure from the brake pedal 202. Further, the comparator 408 may also receive the adjusted braking pressure P4 from the control software module 410. The comparator 408 may be configured to determine the reference pressure P0 as the maximum pressure between the desired braking pressure and the adjusted braking pressure P4 and communicate the reference pressure PO to the first adder 406A and the second adder 406B.

The controller 220 may provide commands indicative of the first adjusted pressure Pa1 and the second adjusted pressure Pa2 to the first valve assembly 208A and the second valve assembly 208B, respectively. Further, the controller 220 may be configured to selectively actuate at least one of the first proportional valve 212A and the second proportional valve 212B based on the comparison of the first pressure and the second pressure to the reference pressure P0. The controller 220 may actuate at least one of the first proportional valve 212A and the second proportional valve 212B based on the first and second adjusted pressures Pa1, Pa2.

In an example, the controller 220 may actuate the first proportional valve 212A if the first pressure adjustment $\Delta 1$ is a non-zero value. The controller 220 may actuate the second proportional valve 212B if the second pressure adjustment $\Delta 2$ is a non-zero value. Further, the controller 220 may actuate the first proportional valve 212A and the second proportional valve 212B if both the first and second brake adjustments $\Delta 1$, $\Delta 2$ have a non-zero value.

The first proportional valve 212A and the second proportional valve 212B may be configured to adjust pressures of the braking fluid to the first and second adjusted pressures Pa1, Pa2 respectively. The first directional valve 210A and the second directional valve 210B in fluid communication with the first proportional valve 212A and the second proportional valve 212B may receive the braking fluid at these adjusted pressures Pa1, Pa2.

The first pressure sensor 216A and the second pressure sensor 216B may determine the first pressure and the second pressure of this braking fluid from the first directional valve 210A and the second directional valve 210B respectively. The comparison of the first pressure and the second pressure to the reference pressure P0 may occur in a closed loop to substantially equalize the first pressure and the second pressure. Further, the controller 220 may determine the first pressure adjustment $\Delta 1$ and the second pressure adjustment $\Delta 2$ based on the comparison and subsequently actuate at least one of the first proportional valve 212A or the second proportional valve 212B.

In an alternative embodiment, the controller 220 may be configured to selectively actuate at least one of the first proportional valve 212A and the second proportional valve 212B based on the comparison between the first pressure and the second pressure. The controller 220 may actuate the first proportional valve 212A if the first pressure is less than the second pressure. Alternatively, the controller 220 may actuate the second proportional valve 212B if the first pressure is greater than the second pressure. Accordingly, the first proportional valve 212A or the second proportional valve 212B may receive an error between the first pressure and the second pressure. Correspondingly, the first proportional valve 212A or the second proportional valve 212B may increase a pressure of the braking fluid to the first directional valve 210A or the second directional valve 210B to substantially equalize the first pressure and the second pressure. Moreover, the controller 220 may monitor the first pressure and the second pressure continuously to determine the error. Upon detecting a non-zero error, the controller 220 may actuate at least one of the first proportional valve 212A or the second proportional valve 212B.

Figure 4:
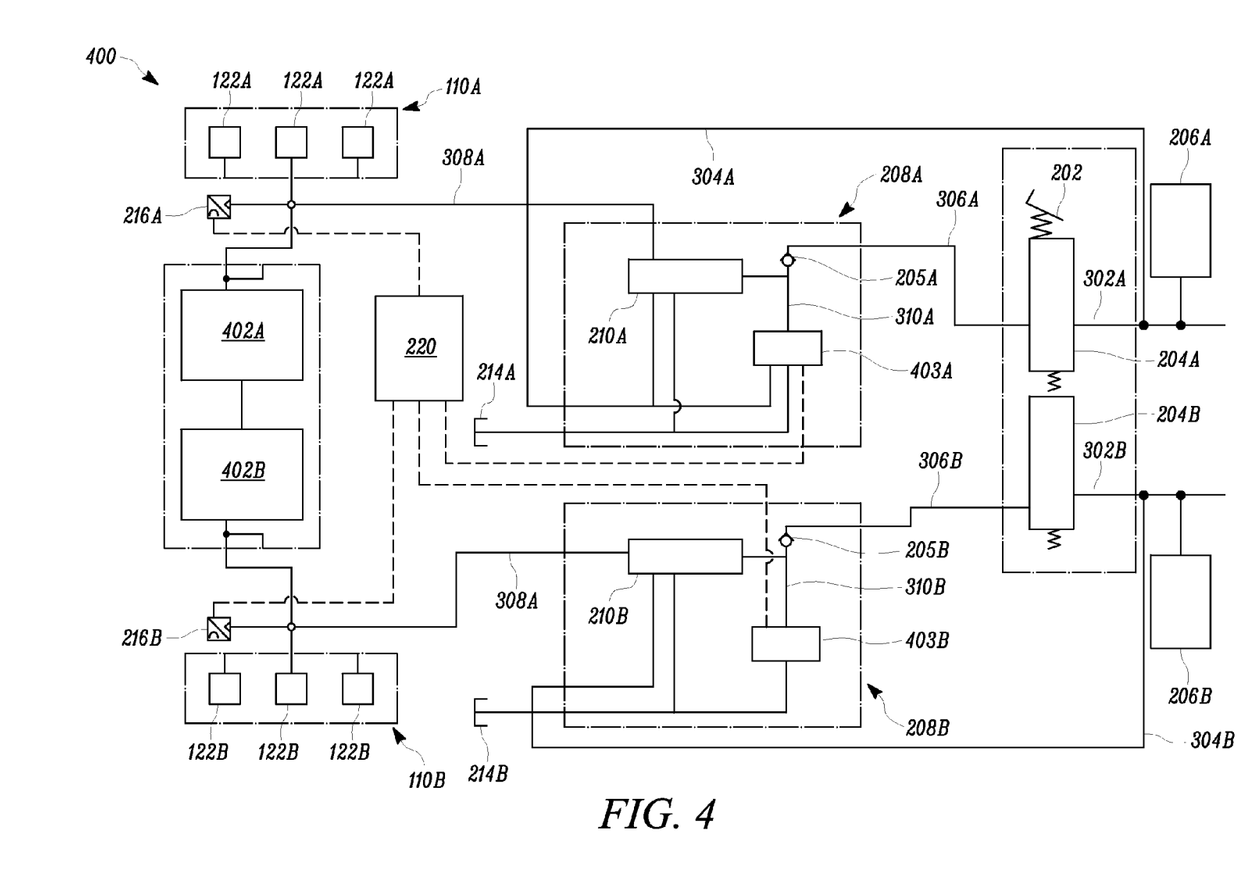
FIG. 4 is a block diagram of the braking system, according to another embodiment of the present disclosure.

Referring to FIG. 4, a braking system 400 according to another embodiment of the present disclosure is illustrated. The braking system 200 is substantially similar to the braking system 200 in structure and operation. The braking system 400 includes the first valve assembly 208A and the second valve assembly 208B. The first valve assembly 208A may include a first solenoid valve 403A in communication with the first directional valve 210A. The second valve assembly 208B may include a second solenoid valve 403B in communication with the second directional valve 210B. In an embodiment, the first and second solenoid valves 403A, 403B may be proportional valves. The braking system 400 further includes the first pressure sensor 216A and the second pressure sensor 216B configured to determine the first pressure and the second pressure of the braking fluid from the first valve assembly 208A and the second valve assembly 208B, respectively. The controller 220 of the braking system 400 may be configured to actuate the first solenoid valve 403A, the second solenoid valve 403B so as to substantially equalize the first and second pressures.

As illustrated in FIG. 4, the braking system 200 may further include at least one electronically actuated directional valve 402 in fluid communication with the first valve assembly 208A and the second valve assembly 208B. In the illustrated embodiment, the braking system 200 includes two electronically actuated directional valves 402A, 402B in fluid communication with each other. Further, the electronically actuated directional valves 402A, 402B may also be in fluid communication with the first and second valve assemblies 208A, 208B respectively. The electronically actuated directional valves 402A, 402B may include two ports and operate in two positions, namely an open position and a closed position. In an embodiment, the electronically actuated directional valves 402A, 402B may be solenoid operated valves.

In an embodiment, the controller 220 may be configured to selectively actuate the electronically actuated directional valves 402 and at least one of the first and second solenoid valves 403A, 403B based on the comparison between the first pressure and the second pressure. Moreover, the controller 220 may actuate the electronically actuated directional valve 402 that is in the closed position to the open position upon determining that at least one of the first pressure adjustment Δ1 and the second pressure adjustment Δ2 has a non-zero value.

In an embodiment, one of the electronically actuated directional valves 402A, 402B may be in a normally closed position while the other electronically actuated directional valve 402 may be in a normally open position. The electronically actuated directional valve 402 in the closed position can be electronically actuated to the open position. The controller 220 may be configured to actuate the electronically actuated directional valve 402 to the open position so as to receive the braking fluid from the corresponding first valve assembly 208A or the second valve assembly 208B. When both the electronically actuated directional valves 402A, 402B are in the open position, the supply lines 308A, 308B are in fluid communication with each other, thereby equalizing pressure of the braking fluid. Therefore, a difference between the first and second pressures may be reduced. With such implementation, the electronically actuated directional valves 402A, 402B may supply the braking fluid to the first and second brakes 122A, 122B, respectively, at substantially equal pressures.

In another embodiment, both the electronically actuated directional valves 402A, 402B may be in a normally closed position. The controller 220 may be configured to selectively actuate the electronically actuated directional valves 402A, 402B to the open positon so as to substantially equalize the first pressure and the second pressure.

Figure 5:
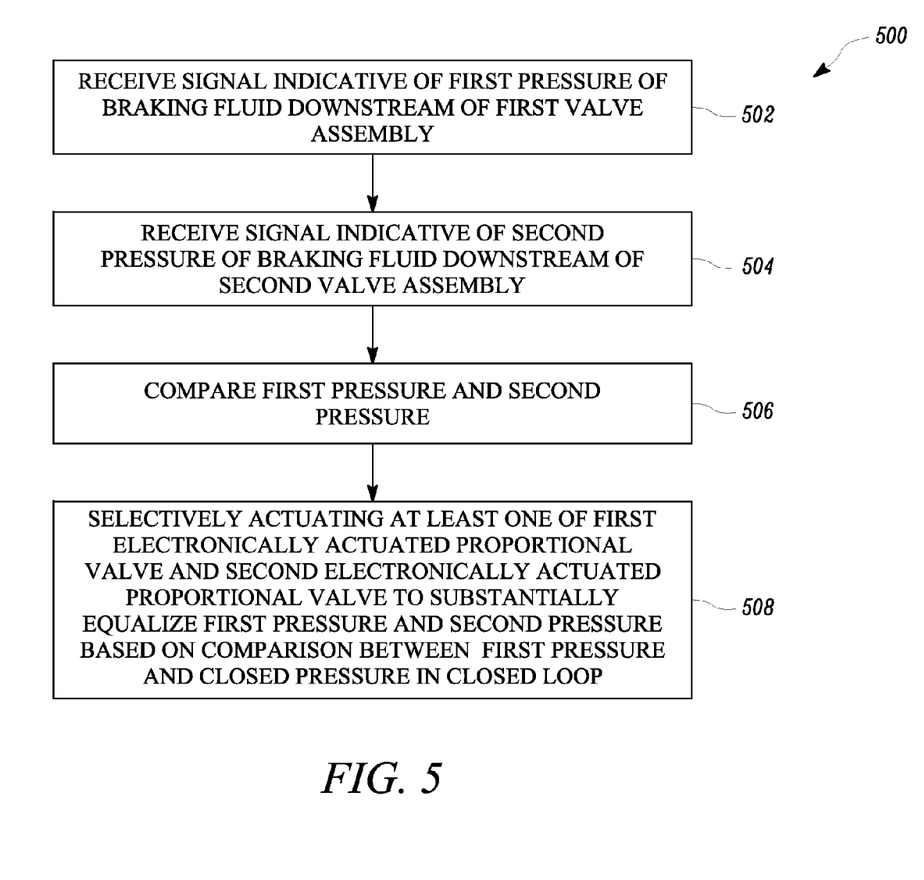
FIG. 5 is a flowchart for a method of operating a braking system, according to an embodiment of the present disclosure.

Referring to FIG. 5, a flowchart for a method 500 of operating a braking system for a machine is illustrated. The braking system may be embodied as the braking system 200 or the braking system 400. The method 500 will be explained in conjunction with the braking system 200. However, it may be contemplated to suitably implement one or more steps of the method 500 to operate other braking systems. A braking command indicative of desired the braking pressure may be generated by actuating the brake pedal 202. Upon actuation of the brake pedal 202, control pressures may be applied to both the first valve assembly 208A and the second valve assembly 208B. Moreover, the first brake valve 204A and the second brake valve 204B may be configured to deliver the pressurized braking fluid to the first valve assembly 208A and the second valve assembly 208B respectively based on the braking command.

At step 502, the method 500 includes receiving a signal indicative of the first pressure of the braking fluid downstream of the first valve assembly 208A. The first valve assembly 208A includes the first directional valve 210A and the first proportional valve 212A.

At step 504, the method 500 includes receiving a signal indicative of the second pressure of the braking fluid downstream of the second valve assembly 208B. The second valve assembly 208B includes the second directional valve 210B and the second proportional valve 212B.

At step 506, the method 500 includes comparing the first pressure and the second pressure. In one embodiment, the controller 220 may be configured to compare the first pressure to the second pressure to determine a pressure error. The pressure error may correspond to a difference between the first pressure and the second pressure. In another embodiment, the controller 220 may be configured to compare the first pressure and the second pressure to the reference pressure P0 to determine the first pressure error E1 and the second pressure error E2. The controller 220 may also determine the first pressure adjustment Δ1 and the second pressure adjustment Δ2 based on the first and second pressure errors E1, E2.

In an embodiment, the controller 220 may additionally determine the first adjusted pressure Pa1 and the second adjusted pressure Pa2. The first adjusted pressure Pa1 may be determined by adding the first pressure adjustment Δ1 with the reference pressure P0. Similarly, the second adjusted pressure Pa2 may be determined by adding the second pressure adjustment Δ2 with the reference pressure P0. In one embodiment, the reference pressure P0 may be the desired braking pressure received from the brake pedal 202. In another embodiment, the reference pressure P0 may be a maximum among the desired braking pressure received from the brake pedal 202 and the adjusted braking pressure P4 determined by the control software module 410.

At step 508, the method 500 includes selectively actuating one of the first proportional valve 212A and the second proportional valve 212B to substantially equalize the first pressure and the second pressure based on the comparison between the first pressure and the second pressure in a closed loop. The controller 220 may actuate at least one of the first proportional valve 212A and the second proportional valve 212B upon determining that at least one of the first pressure adjustment Δ1 and the second pressure adjustment Δ2 is non-zero.

At step 508, the method 500 may also include providing commands indicative of the first adjusted pressure Pa1 and the second adjusted pressure Pa2 to the first valve assembly 208A and the second valve assembly 208B, respectively. Accordingly, upon actuation, the first proportional valve 212A may be configured to supply the braking fluid to the first directional valve 210A at the first adjusted pressure Pa1. Similarly, upon actuation, the second proportional valve 212B may be configured to supply the braking fluid to the second directional valve 210B at the second adjusted pressure Pa2.

Although, the braking systems 200, 400 and the method 500 are explained in conjunction with the first and second set of ground engaging members 110A, 110B on left and right sides of the machine 100, it may be envisioned to implement one or more aspects of the braking systems 200, 400 or the method 500 to the first and second set of ground engaging members on a front side, a rear side, or on a same side of the machine 100.

INDUSTRIAL APPLICABILITY

The present disclosure relates to the braking systems 200, 400 for a machine. Each of the braking systems 200, 400 include the first pressure sensor 216A and the second pressure sensor 216B configured to determine the first and second pressures downstream of the first and second valve assemblies 208A, 208B, respectively. Further, the controller 220 may be communicably coupled to the first pressure sensor 216A and the second pressure sensor 216B to monitor the first and second pressures. Moreover, the controller 200 implements a closed loop control to decrease the bias between the first and second pressures. The present disclosure also relates to the method 500 of operating a braking system. With implementation of the method 500, the first and second pressures downstream of the first and second valve assemblies 208A, 208B may be substantially equalized in a closed loop control.

Closed loop control may dynamically reduce pressure bias including sudden variations. Dynamic reduction of pressure bias may result in improved performance and increased life of various components. Further, existing electronic controllers of a machine may be suitably configured to implement closed loop control. Hence, the number of additional components required for reducing pressure bias may be minimized While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A braking system for a machine comprising:
a first valve assembly comprising a first solenoid valve and a first directional valve fluidly coupled to the first solenoid valve;
a first pressure sensor disposed downstream of the first valve assembly, wherein the first pressure sensor is configured to determine a first pressure of a braking fluid from the first valve assembly;
a second valve assembly comprising a second solenoid valve and a second directional valve fluidly coupled to the second solenoid valve;
a second pressure sensor disposed downstream of the second valve assembly, wherein the second pressure sensor is configured to determine a second pressure of the braking fluid from the second valve assembly;
an electronically actuated directional valve in fluid communication with the first valve assembly and the second valve assembly; and
a controller communicably coupled to the first pressure sensor, the second pressure sensor, the first valve assembly, the second valve assembly and the electronically actuated directional valve, the controller configured to:
receive a signal indicative of the first pressure and the second pressure of the braking fluid downstream of the first valve assembly and the second valve assembly respectively;
compare the first pressure and the second pressure; and
selectively actuate the electronically actuated directional valve and at least one of the first solenoid valve and the second solenoid valve to substantially equalize the first pressure and the second pressure based on the comparison between the first pressure and the second pressure in a closed loop.

2. The braking system of claim 1, wherein the first solenoid valve and the second solenoid valves are proportional valves.

3. The braking system of claim 1, wherein the first valve assembly is disposed in fluid communication with a first brake; wherein the first brake is configured to provide a braking force on a first set of ground engaging members.

4. The braking system of claim 1, wherein the second valve assembly is disposed in fluid communication with a second brake; wherein the second brake is configured to provide a braking force on a second set of ground engaging members.

5. The braking system of claim 1, further comprising:
a brake pedal; and
a brake valve coupled to the brake pedal, the brake valve configured to:
receive an input indicative of a braking pressure from the brake pedal; and
supply the braking fluid to the first valve assembly and the second valve assembly based on the input.

6. The braking system of claim 1, wherein the first valve assembly is disposed in fluid communication with a first brake; wherein the first brake is configured to provide a braking force on a first set of ground engaging members.

7. The braking system of claim 1, wherein the second valve assembly is disposed in fluid communication with a second brake; wherein the second brake is configured to provide a braking force on a second set of ground engaging members.

* * * * *